(12) United States Patent
Egedal et al.

(10) Patent No.: US 8,600,570 B2
(45) Date of Patent: Dec. 3, 2013

(54) SYSTEM FOR TRIGGERING AN EMERGENCY SYSTEM OF A WIND TURBINE

(75) Inventors: Per Egedal, Herning (DK); Ole Kjaer, Grindsted (DK); Mogens Lund, Videbaek (DK)

(73) Assignee: Siemens Aktiengesellschaft, Munich (DE)

( * ) Notice: Subject to any disclaimer, the term of this patent is extended or adjusted under 35 U.S.C. 154(b) by 363 days.

(21) Appl. No.: 12/969,927

(22) Filed: Dec. 16, 2010

(65) Prior Publication Data
US 2011/0153097 A1   Jun. 23, 2011

(30) Foreign Application Priority Data
Dec. 22, 2009 (EP) ..................................... 09015864

(51) Int. Cl.
*G05D 3/12* (2006.01)
*F03D 9/00* (2006.01)
(52) U.S. Cl.
USPC ............................................. 700/287; 290/44
(58) Field of Classification Search
USPC ..................... 700/287, 297; 290/44
See application file for complete search history.

(56) References Cited

U.S. PATENT DOCUMENTS

| 4,348,155 | A | * | 9/1982 | Barnes et al. .................... 416/46 |
| 6,265,785 | B1 | | 7/2001 | Cousineau et al. |
| 2004/0207208 | A1 | | 10/2004 | Mikhail et al. |
| 2007/0018457 | A1 | | 1/2007 | Llorente Gonzalez |
| 2008/0069692 | A1 | * | 3/2008 | Oohara et al. .................... 416/31 |
| 2009/0224543 | A1 | * | 9/2009 | Steudel et al. ................... 290/44 |
| 2010/0158687 | A1 | * | 6/2010 | Dawson et al. .................. 416/31 |

FOREIGN PATENT DOCUMENTS

| DE | 19534404 A1 | 3/1997 |
| DE | 102006001613 A1 | 7/2007 |
| EP | 1903213 A2 | 3/2008 |

\* cited by examiner

*Primary Examiner* — Sean Shechtman

(57) ABSTRACT

In one aspect, a system for triggering an emergency system of a wind turbine is described. The system comprises a sensor for sensing an acceleration value of a portion of the rotor of the wind turbine, an estimation unit coupled to the sensor, wherein the estimation unit is adapted for receiving the acceleration value from the sensor and for estimating a rotor rotational speed value of the rotor of the wind turbine based on the acceleration value, and a triggering unit coupled to the estimation unit, wherein the triggering unit is adapted for receiving the rotor rotational speed value and for triggering the emergency system, when the rotor rotational speed value exceeds a predefined limit value. Further described are a method for triggering an emergency system of a wind turbine, a wind turbine, a computer program and a computer-readable medium, which are all adapted for carrying out the triggering method.

11 Claims, 2 Drawing Sheets

SYSTEM FOR TRIGGERING AN EMERGENCY SYSTEM OF A WIND TURBINE

CROSS REFERENCE TO RELATED APPLICATIONS

This application claims priority of European Patent Office application No. 09015864.3 EP filed Dec. 22, 2009, which is incorporated by reference herein in its entirety.

FIELD OF INVENTION

The present invention relates to the technical field of triggering emergency systems of power generating machines such as wind turbines. In particular, the present invention relates to a system and to a method for triggering an emergency system of a wind turbine. Further, the present invention relates to a wind turbine, to a computer program and to a computer-readable medium, which are adapted for carrying out the above mentioned triggering method.

ART BACKGROUND

When rotors of wind turbines are mounted on a hub, they have an emergency system for switching off the rotor or the wind turbine if there is an overspeed or a too large difference between generator high speed and generator low speed.

Conventional systems of a wind turbine have a redundant over speed detection system, which is able to trig an emergency safety system. An overspeed controller comprises a slave module for measuring the overspeed and a Main Computer (MC) for detecting the overspeed. The limit is a parameter in the main controller, and the sensor is an inductive sensor. A controller over speed, as it is called, trigs the hydraulic emergency system by activating a "Safety Switch". The slave modules in the hub are able to break the safety circuit, but this feature is only used if a communication error at a CAN BUS in the system is detected, or if they are restarted by a watch-dog internal in the slave modules.

Conventional systems comprises further a Low speed Monitoring Unit (LMU) for monitoring the LS (low speed)-speed, and triggering the hydraulic emergency system by hard wired emergency circuit if the limits are exceeded. The LMU outputs a speed feedback to the main computer, which is supervised to insure that the LMU is in operation. Conventional systems comprise furthermore A High Speed (HS) Centrifugal Unit (HCU) for triggering the hard wired emergency circuit if the limit is exceeded. Further, a Speed Sensor Error may be detected by to large differences between generator HS speed and generator LS speed.

There may be a need for providing a system providing a cost effective approach for triggering an emergency system of a wind turbine.

SUMMARY OF THE INVENTION

This need may be met by the subject matter according to the independent claims. Advantageous embodiments of the present invention are described by the dependent claims.

According to a first aspect of the invention there is provided a system for triggering an emergency system of a wind turbine. The system comprises a sensor for sensing an acceleration value of a portion of the rotor of the wind turbine, an estimation unit coupled to the sensor, wherein the estimation unit is adapted for receiving the acceleration value from the sensor and for estimating a rotor rotational speed value of the rotor of the wind turbine based on the acceleration value, and a triggering unit coupled to the estimation unit, wherein the triggering unit is adapted for receiving the rotor rotational speed value and for triggering the emergency system, if the rotor rotational speed value exceeds a predefined limit value.

The described system is based on the idea that during for example a rotor azimuth estimation, sub results may be used for a measurement of the acceleration of a portion of the rotor. The measured or sensed acceleration value of a portion of the rotor may be used for estimating a rotational speed of the rotor. The speed measurement may be very precise in mean, seen over one revolution. In normal operation, the speed measurement may be sufficient for monitoring application (about 2% accuracy). The system may allow to remove the LMU as used in conventional systems and also to remove the low speed sensor.

According to an embodiment of the invention, the sensor is an accelerometer. The accelerometer may be located in the hub or at a portion of the rotor, for example the blades. In conventional systems, a normal speed sensor was located on the main shaft. In this embodiment, for example two axis accelerometers may be used.

According to a further embodiment of the invention, the sensor is adapted for sensing the direction of the gravity forces of the rotor. The gravity forces may occur during movement of the rotor.

According to a further embodiment of the invention, the estimation unit is located in a control unit of the wind turbine. The control unit may be for example the main controller. The estimation unit may also be located in a hub module, which is separated from the main controller. The Hub module may have individual access to the emergency circuit, so that it may stop the turbine itself.

According to a further embodiment of the invention, the system comprises further a high rotational speed sensor for sensing a high rotational speed value of the rotor, a comparator unit adapted for receiving the high rotational speed value from the high rotational speed sensor and for receiving the rotor rotational speed value, wherein the comparator unit is further adapted for obtaining a comparison value based on a comparison of the high rotational speed value and the rotor rotational speed value, and a detection unit adapted for detecting a speed sensor error based on the result of the comparator unit, if the comparison value exceeds a predefined limit. By this embodiment, it may be possible to remove the LS speed sensor also for measuring a speed sensor error. In conventional systems, the speed sensor error is measured by detecting to large differences between generator HS speed and generator LS speed. Both speeds are measured in conventional systems by speed sensors, attached to the gearbox and the main shaft.

According to a further embodiment of the invention, the system comprises further an over speed controller for triggering the emergency system, if the detected over speed exceeds a predefined limit value. An over speed may be measured by a slave module and detected by the Main Computer (MC). The limit value may be a parameter stored in the main controller. A controller over speed, as it may be called, may trigger the hydraulic emergency system by activating the "Safety Switch". The safety switch is a switch, which may close a circuit for activating or triggering the emergency system. The slave modules in the hub may be able to break the safety circuit, but this feature may be used for example only if a communication error at the CAN BUS is detected, or if they are restarted by the watch-dog internal in the slave modules.

According to a further embodiment of the invention, the over speed controller comprises an inductive sensor for sensing the over speed. The inductive sensor may be an electronic proximity sensor. The sensor may be also used for sensing the HS speed.

According to a further aspect of the invention there is provided a method for triggering an emergency system of a wind turbine. The method comprises sensing an acceleration value of a portion of a rotor of the wind turbine by a sensor, receiving the acceleration value from the sensor by an estimation unit coupled to the sensor, estimating a rotor rotational speed value of the rotor of the wind turbine based on the acceleration value, receiving the rotor rotational speed value from the estimation unit by a triggering unit coupled to the estimation unit, and triggering the emergency system, if the rotor rotational speed value exceeds a predefined limit value.

Also the described method is based on the idea that, during for example a rotor azimuth estimation, sub results of the rotor azimuth estimation may be used for a measurement of the acceleration of a portion of the rotor so that a low speed (LS) sensor is not necessary.

According to a further aspect of the invention there is provided a wind turbine, which comprises an emergency system and a system for triggering the emergency system of the wind turbine as described above.

The wind turbine may comprise the system for example within a controller or computer. Thus, values of a rotor azimuth estimation may be reused for triggering an emergency system.

According to a further aspect of the invention there is provided a computer program for triggering an emergency system of a wind turbine. The computer program, when being executed by a data processor, is adapted for controlling the above described method for triggering an emergency system of a wind turbine.

As used herein, reference to a computer program is intended to be equivalent to a reference to a program element containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

According to a further aspect of the invention there is provided a computer-readable medium (for instance a CD, a DVD, a USB stick, a floppy disk or a hard disk), in which a computer program for triggering an emergency system of a wind turbine is stored, which computer program, when being executed by a processor, is adapted to carry out or control a method for triggering an emergency system of a wind turbine.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
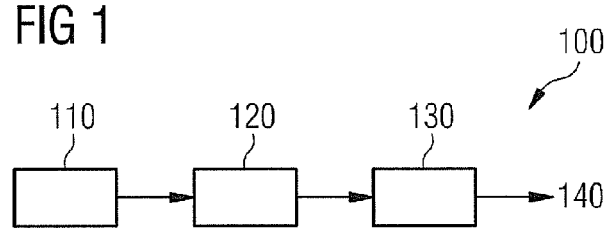
FIG. 1 shows a system according to an embodiment of the present invention.

The illustration in the drawing is schematically. It is noted that in different figures, similar or identical elements are provided with the same reference signs or with reference signs, which are different from the corresponding reference signs only within the first digit.

FIG. 1 shows an exemplary embodiment according to the invention. The system 100 for triggering an emergency system of a wind turbine comprises a sensor 110 for sensing an acceleration value of a portion of the rotor of the wind turbine. An estimation unit 120 is coupled to the sensor 110. The estimation unit is adapted for receiving the acceleration value from the sensor and for estimating a rotor rotational speed value of the rotor of the wind turbine based on the acceleration value. A triggering unit 130 is coupled to the estimation unit 120. The triggering unit is adapted for receiving the rotor rotational speed value and for triggering the emergency system 140, if the rotor rotational speed value exceeds a predefined limit value. The predefined limit value may be stored in a hub module of the wind turbine system.

Figure 3:
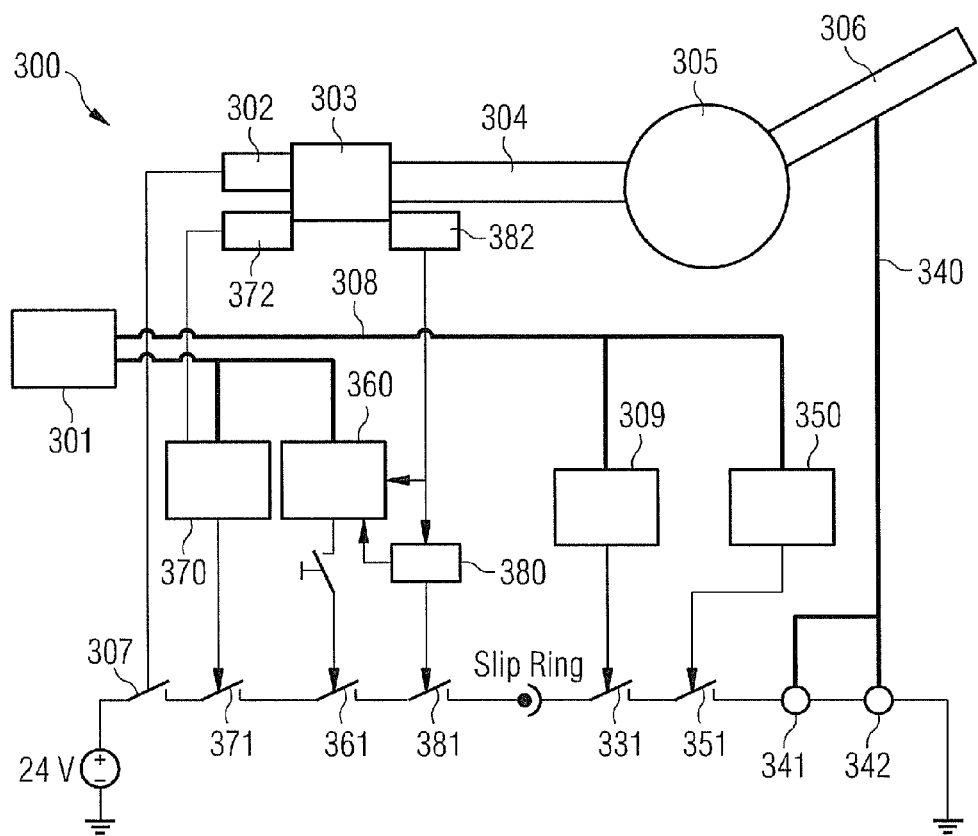
FIG. 3 shows a conventional system for triggering an emergency system of a wind turbine.

FIG. 3 shows a conventional system for triggering an emergency system of a wind turbine. The system 300 comprises a blade 306, which is mounted on a hub 305. The hub is coupled to a main shaft 304 which is coupled to a gear box 303. Attached to the main shaft 304 is a sensor 382 for sensing a low speed (LS). Attached to the gear box 303 is a sensor 372 for sensing a high speed (HS).

An overspeed is measured by a slave module (IOM1) 370 receiving a signal from the HS sensor 372 and is detected by the Main Computer (MC) 301. The limit for the overspeed is a parameter, which is stored in the main controller. The HS sensor 372 is an inductive sensor. A controller over speed, as it is called, trigs the hydraulic emergency system 340, comprising at least two hydraulic valves 341, 342, by activating the "Safety Switch" 371.

The slave modules 360, 370, 309, 350 in the hub are able to break the safety circuit for example via switches 361, 331, 351, but this feature is today only used if a communication error at the CAN BUS 308 is detected, or if they are restarted by the watch-dog internal in the slave modules.

A low speed (LS) monitoring unit (LMU) 380 monitors the LS speed, and trigs the hydraulic emergency system by a hard wired emergency circuit 361, 381 if the limits are exceeded.

The LMU outputs a speed feedback to the main computer, which are supervised to insure that the LMU is in operation. A high speed (HS) centrifugal unit (HCU) 302 trigs the hard wired emergency circuit 307 if the limit is exceeded. A speed sensor error is detected by to large differences between the generator HS speed and the generator LS speed.

Figure 2:
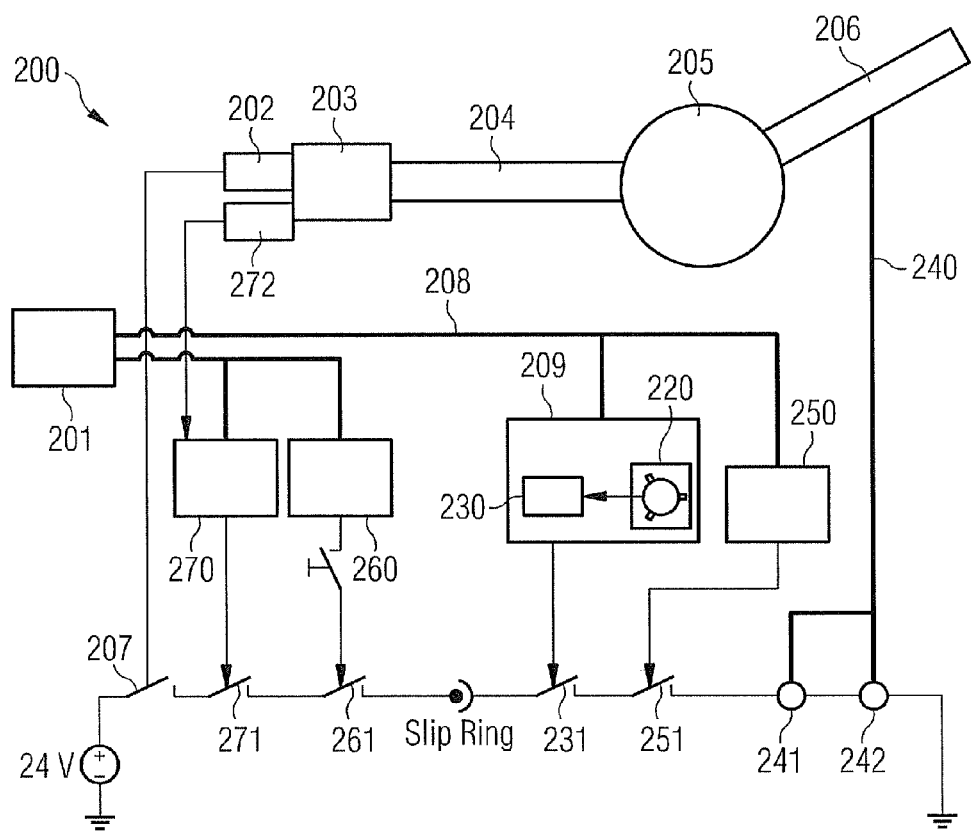
FIG. 2 shows a system according to a further embodiment of the present invention.

FIG. 2 illustrates a system according to a further embodiment of the invention. As the conventional system illustrated in FIG. 3, the system 200 comprises a blade 206, which is mounted on a hub 205. The hub is coupled to a main shaft 204 which is coupled to a gear box 203. Attached to the gear box 203 is a sensor 272 for sensing a high speed (HS).

An overspeed is measured by a slave module (IOM1) 270 receiving a signal from the HS sensor 272 and is detected by the Main Computer (MC) 201. The limit for the overspeed is a parameter, which is stored in the main controller. The HS sensor 272 is an inductive sensor. A controller over speed, as it is called, trigs the hydraulic emergency system 240, comprising at least two hydraulic valves 241, 242, by activating the "Safety Switch" 271.

The slave modules 260, 270, 209, 250 in the hub are able to break the safety circuit for example via switches 261, 231, 251, but this feature is only used if a communication error at the CAN BUS 208 is detected, or if they are restarted by the watch-dog internal in the slave modules.

In contrast to the conventional system, where a low speed (LS) monitoring unit (LMU) 380 monitors the LS speed, and trigs the hydraulic emergency system by a hard wired emergency circuit 361, 381 if the limits are exceeded, the system 200 according to this embodiment comprises a smart LMU unit or estimation unit 230, which is based on the speed estimation 220 which is a sub result in rotor azimuth estimation. The sensor is an accelerometer, sensing the direction of the gravity forces. The speed measurement is very precise in mean, seen over one revolution. In normal operation, the speed measurement will be sufficient for monitoring application (about 2% accuracy). This estimator is placed in the hub module 209, which is separated from the main computer 201. The hub module has also individual access to the emergency circuit via switch 231, so that it can stop the turbine itself.

A high speed (HS) centrifugal unit (HCU) 202 trigs the hard wired emergency circuit 207 if the limit is exceeded. A speed sensor error is detected by to large differences between the generator HS speed and the generator LS speed, wherein the value of the HS-speed sensor is compared with the rotor-speed estimated by the estimation unit. This gives the possibility to remove the LS-speed sensor as used in the conventional system. It might be necessary to run a calibration on the speed estimator (estimation unit) the first 30 min after the erection before the turbine can be released for operation.

Instead of using a normal speed sensor on the main shaft as in the conventional system, the speed is estimated using two axis accelerometer in the hub. This makes it possible to remove a speed sensor and replace the LS speed unit (LMU) for example with a software function in the existing hub-controller. Speed sensor error can also be detected by comparing the generator speed sensor with the estimated speed.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A system for triggering an emergency system of a wind turbine, the emergency system stops the wind turbine when triggered, the system comprising a sensor for sensing an acceleration value of a portion of the rotor of the wind turbine, the sensor is an accelerometer;

an estimation unit coupled to the sensor, the estimation unit is adapted for receiving the acceleration value from the sensor and for estimating a rotor rotational speed value of the rotor of the wind turbine based on the acceleration value;

a triggering unit coupled to the estimation unit, the triggering unit is adapted for receiving the estimated rotor rotational speed value, for determining the estimated rotor rotational speed value exceeds a predefined limit value and for triggering the emergency system, which comprises plurality of hydraulic valves, by activating a safety switch as a result of the determining;

a first rotational speed sensor for sensing a first rotational speed value of the rotor, a comparator unit adapted for receiving the first rotational speed value from the first rotational speed sensor and for receiving the estimated rotor rotational speed value, wherein the comparator unit is further adapted for obtaining a comparison value based on a comparison of the first rotational speed value and the estimated rotor rotational speed value, and a detection unit adapted for determining the comparison value exceeds a speed sensor error.

2. The system as set forth in claim 1,
wherein the sensor is adapted for sensing the direction of the gravity forces of the rotor.

3. The system as set forth in claim 1,
wherein the estimation unit is located in a control unit of the wind turbine.

4. The system as set forth in claim 1, further comprising:
an over speed controller for triggering the emergency system when a detected over speed exceeds a predefined limit value.

5. The system as set forth in claim 4,
wherein the overspeed controller comprises an inductive sensor for sensing the over speed.

6. A wind turbine comprising
An emergency system which stops the wind turbine when triggered; and
a system triggering the emergency system, the system comprising:
a sensor for sensing a first acceleration value of a portion of the rotor of the wind turbine, the sensor is an accelerometer;

an estimation unit coupled to the sensor, the estimation unit is adapted for receiving the acceleration value from the sensor and for estimating a rotor rotational speed value of the rotor of the wind turbine based on the acceleration value;

a triggering unit coupled to the estimation unit, the triggering unit is adapted for receiving the estimated rotor rotational speed value, for determining the estimated rotor rotational speed value exceeds a predefined limit value and for triggering the emergency system, which comprises plurality of hydraulic valves, by activating a safety switch as a result of the determining;

a first rotational speed sensor for sensing a first rotational speed value of the rotor, a comparator unit adapted for receiving the first rotational speed value from the first rotational speed sensor and for receiving the estimated rotor rotational speed value, wherein the comparator unit is further adapted for obtaining a comparison value based on a comparison of the first rotational speed value and the estimated rotor rotational speed value, and a detection unit adapted for determining the comparison value exceeds a speed sensor error.

7. The wind turbine as set forth in claim 6, wherein the sensor is adapted for sensing the direction of the gravity forces of the rotor.

8. The wind turbine as set forth in claim 6, wherein the estimation unit is located in a control unit of the wind turbine.

9. The wind turbine as set forth in claim 6, the system for triggering the emergency system further comprising:
an over speed controller for triggering the emergency system when a detected over speed exceeds a predefined limit value.

10. The system as set forth in claim 9,
wherein the overspeed controller comprises an inductive sensor for sensing the over speed.

11. A method for triggering an emergency system of a wind turbine, the method comprising
sensing an acceleration value of a portion of a rotor of the wind turbine by an accelerometer;
receiving the acceleration value from the sensor by an estimation unit coupled to the sensor;
estimating a rotor rotational speed value of the rotor of the wind turbine based on the acceleration value;
receiving the rotor rotational speed value from the estimation unit by a triggering unit coupled to the estimation unit;
determining the rotational speed value exceeds a predefined value;
triggering the emergency system, which comprises at plurality of hydraulic valves, by activating a switch such that the wind turbine is stopped in response to the determining the rotational speed value exceeds a predefined value;
sensing a first rotational speed value of the rotor by a first rotational speed sensor;
receiving the first rotational speed value from the first rotational speed sensor by a comparator unit;
receiving the estimated rotor rotational speed value by the comparator unit;
obtaining a comparison value based on a comparison of the first rotational speed value and the estimated rotor rotational speed value by the comparator unit;
detecting a speed sensor error as a result of the comparison value exceeding a predefined value.

* * * * *